United States Patent [19]

Mulot

[11] 3,834,255

[45] Sept. 10, 1974

[54] MACHINE FOR AUTOMATICALLY FORMING SCREW-THREADS

[76] Inventor: Georges C. Mulot, 152, rue Paul Doumer, Carriere-sur-Seine, France

[22] Filed: Aug. 3, 1973

[21] Appl. No.: 385,553

[30] Foreign Application Priority Data
Aug. 4, 1972 France .............................. 72.28310

[52] U.S. Cl. .................................................... 82/5
[51] Int. Cl. ............................................. B23b 5/46
[58] Field of Search .......................................... 82/5

[56] References Cited
UNITED STATES PATENTS

| | | | |
|---|---|---|---|
| 3,169,426 | 2/1965 | Renoux | 82/5 |
| 3,332,305 | 7/1967 | Renoux | 82/5 |
| 3,472,104 | 10/1969 | Berly | 82/5 |

*Primary Examiner*—Leonidas Vlachos
*Attorney, Agent, or Firm*—Lane, Aitken, Dunner & Ziems

[57] ABSTRACT

The cutting tool of a machine for automatically cutting screw threads is carried by a cross-slide mounted on the base of the machine. The step-by-step transverse feed of the tool is actuated by a push-rod operating against the cross-slide and backed by an adjustment vernier operating colinearly with the push-rod and mounted on the machine base. Between the vernier and push-rod are peripheral portions of a pair of discs which are mounted face-to-face for rotational movement step-by-step about an axis parallel to the line of action of the push-rod and for movement along said axis. The two faces of each disc are planar and non-parallel, and the angle between the two faces of the disc is the same for each disc. By adjusting the angular positions of the discs relative to each other and the angular position of the disc assembly about said axis, a desired programme of automatic thread-cutting operations can be pre-set.

5 Claims, 10 Drawing Figures

MACHINE FOR AUTOMATICALLY FORMING SCREW-THREADS

The present invention concerns a machine for automaticallly forming screw-threads by a succession of variable cuts, comprising a cross slide which carries the tool and which is moved transversely by the action of a push-rod on which there acts a transverse adjustment vernier.

In the known machines of this kind, the succession of screw-thread forming cuts is generally achieved by means of a system of variable cams consisting of two eccentrics disposed at equal distances off-centre. The two eccentrics are angularly adjustable relatively to each other, and the unit consisting of the two eccentrics is likewise positionally adjustable in relation to the shaft that carries them. It is thus a simple matter to achieve the desired succession of cuts which usually diminish in extent progressively but which may also be the same as each other if so required.

However in the screw-thread forming machines using such system of variable cams, the transverse adjustment vernier takes effect in the middle of the kinetic chain, i.e., among the moving parts or close to the tool, and this means having movable adjusting elements in any case. This mobility of the adjusting elements is however obviously prejudicial to their accuracy.

Furthermore, various elements such as levers, racks and return members are necessary for displacing the plate on which the guide means of the cross slide bears. An arrangement of this kind inevitably involves deflection of certain parts and this results in variations in the diameters of the screw-threaded parts.

The present invention provides a machine for automatically forming screw-threads by a succession of variable cuts, comprising a base, a cross slide for carrying the cutting tool for longitudinal and transverse movement with respect to a workpiece, which cross-slide is mounted on the base, a push-rod for moving the tool-carrying slide in a sense to vary the depth of cut, an adjustment vernier connected to the base and mounted in line with the push-rod, and means for controlling the depth of successive cuts which means includes two discs disposed in face-to-face contact between the vernier and the push-rod and mounted for rotation about an axis parallel to the line of action of the push-rod and for axial movement, and means for rotating the discs stepwise about said axis, each of said discs having two planar non-parallel faces, the faces of one disc forming with each other the same angle as those of the other disc, and the two discs being placed one against the other in relative angular positions which are adjustable.

It will be readily appreciated that by turning one of the discs relative to the other, the axial end faces of the pair of discs together provide a compound angle which may vary from zero to twice the angle formed by the faces of each of the discs. Furthermore, by turning the unit consisting of the two discs relative to the shaft supporting them, the zone of action is altered, and this enables a succession of cuts to be obtained that is identical to that which can be obtained with the known system employing two eccentric cams, the degree of inclination of the discs being comparable to the degree of eccentricity of the cams.

In arrangements in accordance with the invention, all the parts are aligned and operate virtually under simple compression, that is to say under ideal conditions. The assembly thus obtained is therefore particularly rigid. It will also be noted that the number of parts directly involved in determining the transverse position of the tool is reduced to a strict minimum which confers unrivalled precision upon the assembly.

Furthermore, since the transverse adjustment vernier remains completely stationary during the entire screw-thread forming operation, it can be extremely accurate and there is virtually no problem as regards accessibility.

In one particular embodiment of the invention, there is provided a timing cam interposed between the discs and the push-rod and mounted to rotate about an axis parallel to the line of action of the push-rod the cam having a cam face against which the push-rod bears and which is shaped to advance the push-rod and tool for each cut and to permit withdrawal of the push-rod and tool at the end of each cut.

Thus the part that causes the return and penetration movements of the tool and which consequently, in conjunction with the reciprocatory movement of the cross slide, enables the rectangular cycle characteristic of screw-thread forming machines to be obtained, is positioned on the same line of action and likewise operates under compression. Furthermore, since this timing cam is disposed between the push-rod and the two discs, its rotation does not involve any displacement of the discs which therefore remain firmly applied against the vernier, this promoting high precision in the forming of the screw-thread. Preferably an alternating rotational movement is imparted to the timing cam by means of a rocking lever actuated by a continuously rotating cam which turns in synchronism with the stepping cam that causes longitudinal displacement of the tool. With this arrangement, the timing cam remains stationary during the screw-thread forming operation proper, and during each cut. The precision of the screw-thread forming operation thus achieved is therefore completely independent of the profile of the timing cam and consequently of any wear that is may suffer.

In a modified embodiment, the timing cam is caused to execute a continuous rotational movement by means of a pinion so that it turns in synchronism with a cam which controls the longitudinal movement of the cross-slide and tool. This arrangement is less precise than the one previously described but it enables screw-threads of varying profiles, for example graduated profiles, to be obtained by means of a simple alteration of the profile of the timing cam.

There is also preferably provided a shaft on which the discs are mounted for their rotation and axial movement, a pawl and ratchet mechanism connected to rotate the shaft and discs stepwise, means for disconnecting the pawl from the ratchet on completion of a sequence of cuts, a return spring for returning the discs, ratchet and shaft to their initial positions, and damping means for damping the return movement of the discs and shaft.

These shock-absorbing means, which are preferably hydraulic but may also be of the friction type, prevent too sudden an impact on the shaft on completion of travel, and said means thus reduce or eliminate the risk of the ramped discs being displaced relative to this shaft under the effect of their inertia.

One embodiment of the invention will now be described by way of example with reference to the annexed drawings in which.

Figure 1:
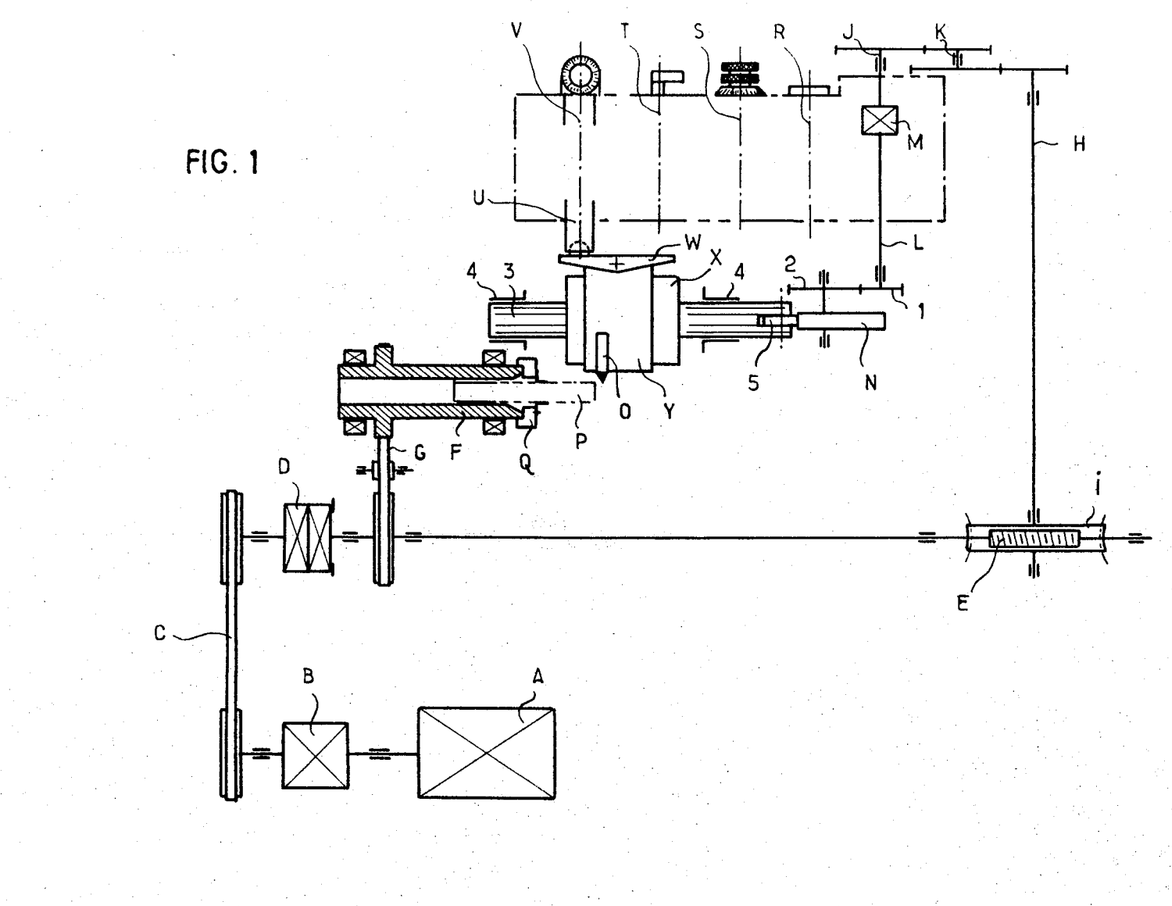
FIG. 1 is a diagrammatic view of the assembly constituting the kinetic chain of a screw-thread forming machine in accordance with the invention.

Referring first to FIG. 1 which shows diagrammatically the assembly constituting the kinetic chain of the machine, a motor A, which may be an electric motor, drives the moving part of a clutch D by way of a reduction gear B or any other means performing the same function, and a transmission system C. Clutch D, which in FIG. 2 is shown as being a pneumatically controlled cone-type clutch but which could also be of some other type, transmits the rotational movement of the motor A to a worm screw E and, by way of a transmission unit G, to a spindle F of the machine.

The rotation of the worm screw E is transmitted to a shaft H through a worm wheel I which reduces the initial speed in a fixed ratio. The rotation of the shaft H is in turn transmitted to a shaft J through an assembly K consisting mainly of an intermediate shaft and, if necessary, of a reversing pinion the object of which is to reverse the direction of rotation of the following elements when the spindle F is driven in a direction opposite to the usual one.

The rotational movement of the shaft J is transmitted to a coaxial shaft L through a dog-clutch M. This shaft L first drives, through two pinions 1 and 2, a feed cam N which controls the reciprocatory movement of the longitudinal slide X. This longitudinal slide is in fact carried by a tube 3 adapted to slide freely in two bushes 4 and bearing by one of its ends on the contour of the cam N by way of a roller 5 as can be seen more clearly in the perspective view of FIG. 2. The cross slide Y is mounted to slide on the longitudinal slide X in a dovetail slide-way, and carries a tool O adapted to form the required screw-thread in the workpiece P which is held in the spindle F by a chuck Q.

Figure 2:
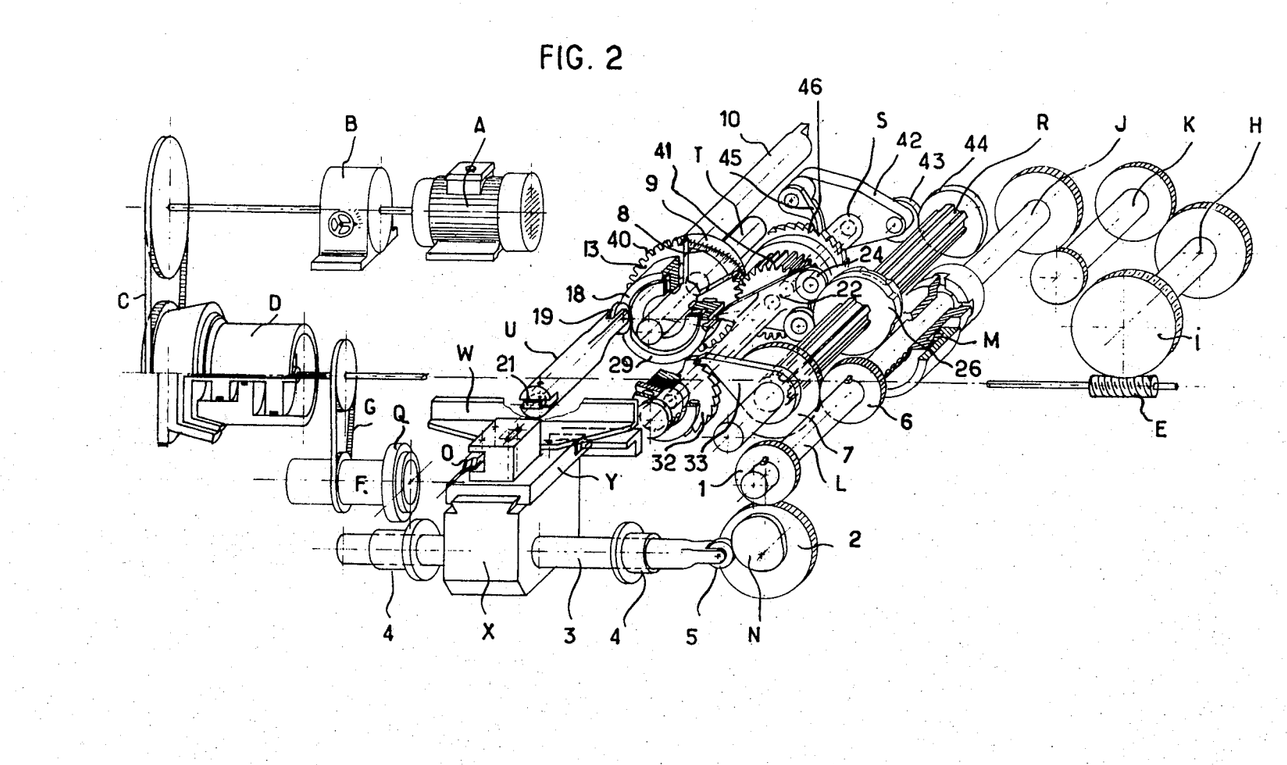
FIG. 2 is a simplified view of this kinetic chain in isometric projection.

The shaft L also imparts rotation to a parallel shaft R by way of two pinions 6 and 7 which can be seen in FIG. 2. Furthermore, since the ratio of these pinions 6 and 7 is the same as that of the pinions 1 and 2, the shaft R rotates at the same speed as the feed cam N and thus in synchronism therewith. It is this shaft R which controls all the component intermittent transverse movements of the tool O. This transverse control of the tool is of course achieved by means of a certain number of intermediate elements which will be described in detail hereinafter and which, in addition to two lines of shafts S and T, include a push-rod U which is associated with a transverse adjustment vernier V and one end of which bears on the guide means W of the cross slide Y, all as shown in FIG. 1.

It might also be pointed out that henceforward there are two component intermittent transverse movements of the tool namely: the radial feed (penetration) and withdrawal movement of the tool, which movement, combined with the reciprocatory movement of the cross slide X imparted by the cam N causes cyclic tool displacement of rectangular form characteristic of screw-thread forming machines, and the stepwise advance movement of the tool into the workpiece, this movement corresponding to the depth of the cut.

Figure 3:
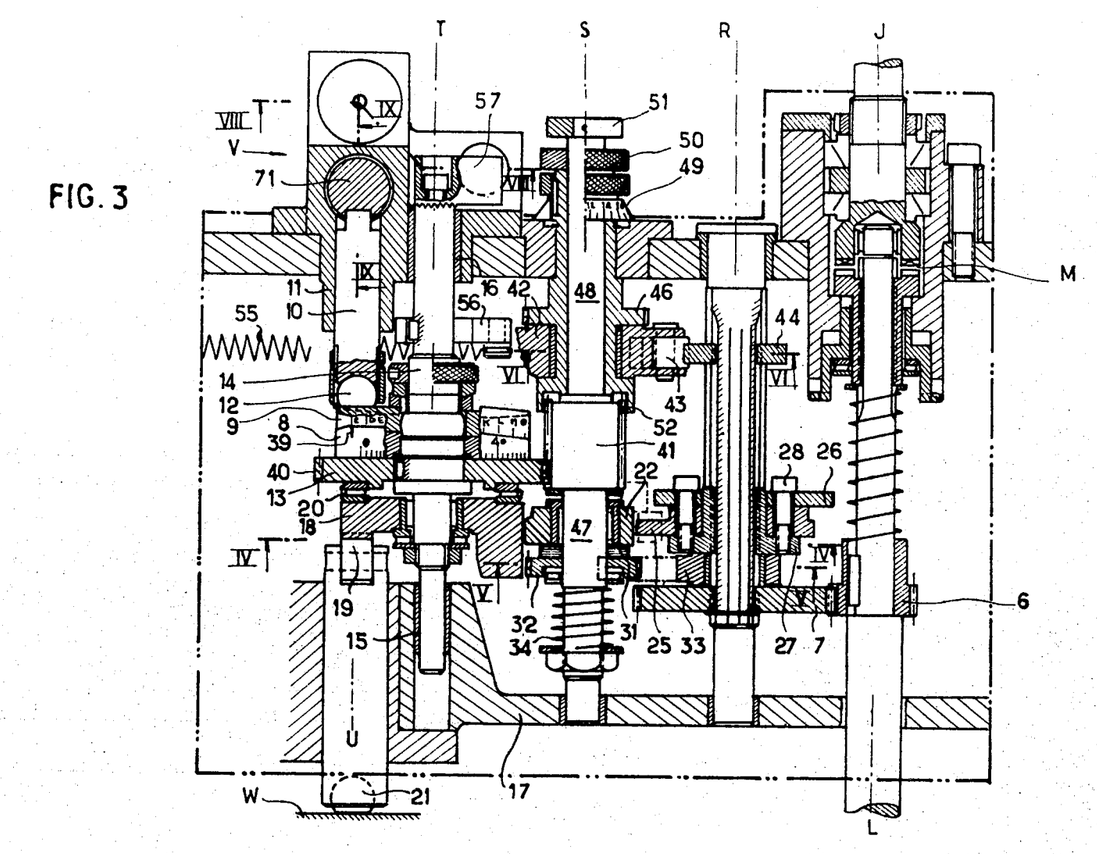
FIG. 3 is a sectional view, on a larger scale, of part of the kinetic chain controlling the transverse movement of the tool.

Referring now to FIGS. 2 and 3 it will be seen that the vernier V is mounted in line with the push-rod U acting on the guide means W of the cross slide Y. Furthermore, disposed between said vernier and said push-rod, are two superposed discs 8 and 9 the purpose of which is to advance the tool in a stepwise manner by way of the push-rod U. It will also be clearly seen hereinafter that the movable part of the vernier, consisting mainly of a cylindrical rod 10 adapted to slide longitudinally in a body 11, remains completely stationary during the entire screw-thread forming operation, simply bearing on the superposed discs 8 and 9 through a spherical shoe 12.

The two discs 8 and 9 are securely connected to the shaft T which is paralel to rod 10 and push-rod U. The discs are supported from beneath by a plate 13, toothed over its periphery, and are clamped against this plate, in variable relative angular positions, by means of a nut 14. The shaft T is mounted to slide in two bearings 15 and 16 carried by the frame 17 of the machine, and said shaft is caused to execute a stepwise rotational movement by a pawl and ratchet system which will be described in greater detail hereinafter.

Also fitted between the toothed plate 13 and the push-rod U is a timing cam 18 which is loosely mounted on the shaft T and the purpose of which is to actuate the penetration and withdrawal movements of the tool. The push-rod U in fact bears on the contour of this cam by way of a roller 19, whereas the other face of the cam bears against the lower face of the plate 13 by way of a needle bearing 20. It will also be observed that a shoe 21 is fitted between the push-rod U and the guide means W for the cross slide Y.

Figure 4:
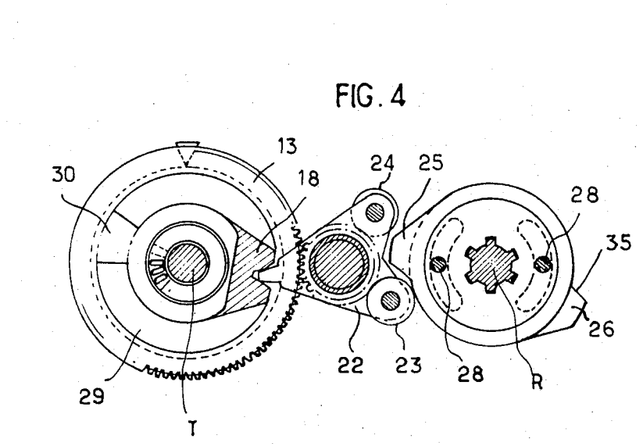
FIG. 4 is a sectional view on line IV—IV of FIG. 3.

In the arrangement here illustrated, an oscillatory rotational movement is imparted to the timing cam 18 by a mechanism now to be described by reference to FIG. 4 in particular.

This mechanism in the first place comprises a rocking lever 22 which is mounted to rotate freely on the intermediate line of shafts S and which is of generally triangular form. One of the corners of the triangle engages in a slot in the timing cam, and the other two corners carry rollers 23 and 24 respectively. Also, these two rollers are offset from each other axially, and for sake of convenience the lower roller will be referred to as roller 23 and the upper roller as roller 24 when dealing with FIG. 3.

The rocking lever 22 is actuated by means of two projections 25 and 26 carried by a cam mounted on a common support 27 firmly connected to the shaft R. The two cams are likewise offset from each other axially so that the projections 25 and 26 co-operate respectively with the rollers 23 and 24 when the shaft R is continuously rotated, which rotation takes place in synchronism with that of the cam N. The angular positions of these two cams are adjustable in relation to their support 27 by means of bolts 28 co-operating with arcuate slots formed in each of the cams.

The mechanism just described operates in the following manner:

Suppose that initially the tool O is in the advanced (working) position, i.e., as shown in the Figure, with the roller 19 of the push-rod U bearing on the face 29 of the timing cam. On completion of the screw-thread cutting operation, the projection 25 on the lower cam, during the course of its rotation, applies pressure to the associated roller 23 thus causing the lever 22 to swing in the clockwise direction as seen in FIG. 4. Consequently the timing cam 18 turns in the opposite direction and the roller 19 on the push-rod is then applied to the depression 30 formed in the face of the timing cam and this causes a corresponding return movement of the tool. It should be pointed out here that the roller 19 is always firmly applied to the contour of the timing cam under the action of the cross slide Y which is constantly urged toward the shoe 21 by a conventional spring arrangement or by a pneumatic cylinder.

Figure 5:
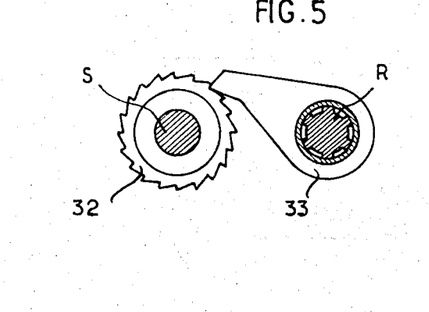
FIG. 5 is a sectional view on line V—V of FIG. 3.

This rotational movement of the timing cam is controlled by means of a stack of brake discs 31 disposed between the rocking lever 22 and a ratchet 32 which is held against rotation by a pawl 33 mounted on the shaft R as will be seen more clearly in the detail view of FIG. 5. A spring 34 is used for urging the ratchet 32 against the discs 31 with a certain pressure. The return movement of the longitudinal slide X towards its initial position obviously takes place while the roller 19 on the push-rod bears in the depression 30 in the timing cam and thus while the tool O is in the retracted position. Upon completion of the travel of the longitudinal slide, the projection 26 on the upper cam applies pressure to the associated roller 24 and forces it to ride over the inclined face 35. As this happens the rocking lever 22 swings in the opposite direction as does the timing cam 18. The roller 19 on the push-rod then again bears on the inclined face 29 of the cam thereby causing the tool to advance, i.e., to penetrate the workpiece P. It should be noted that in this case the rotational movement of the timing cam is not braked, the pawl 33 acting only in one direction on the ratchet wheel 32.

It will be seen that the push-rod U, which is constantly acted on by the guide means W for the cross slide Y, first brings about the necessary retraction of the tool and then the required penetration movement thereof during each revolution of the shaft R. The alternating rotational movement of the timing cam 18 should of course be perfectly synchronized with the reciprocating movement of the longitudinal slide X caused by the cam N, and this can be very readily achieved by simply altering the angular position of the projections 25 and 26 on the cams in relation to their support 27.

It should be noted that in this form of construction the timing cam 18 which causes the advance and return movements of the tool remains stationary during the actual machining of the workpiece and this enables a screw-thread of very great precision to be obtained whatever the extent of any wear that may occur on the contour of this cam.

Figure 10:
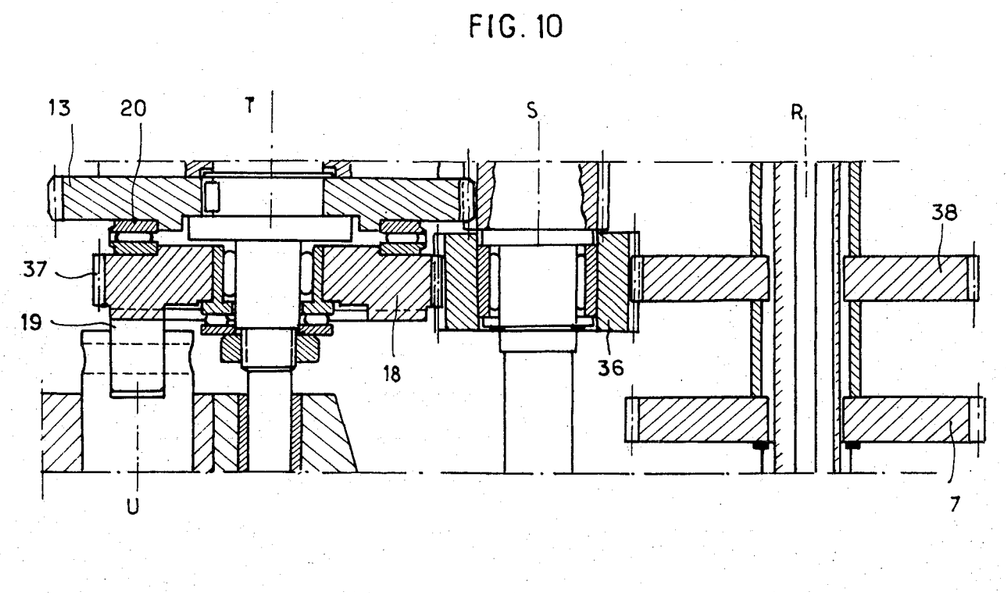
FIG. 10 is a view, partly in section, illustrating a modification of the machine.

On the other hand, in the modified arrangement illustrated in FIG. 10, a continuous rotational movement is imparted to the cam by an auxiliary pinion 36 mounted loosely on the shaft S, which pinion meshes with a toothed portion 37 formed on the periphery of the cam. This auxiliary pinion 36 is itself causes to rotate by a second pinion 38 which is keyed onto the shaft R and has the same number of teeth as the peripheral toothed portion 37 of the cam. The latter always rotates in synchronism with the cam N.

In the example here illustrated, the cam 18 comprises two zones, the recessed zone corresponding to the retracted position of the tool and the full zone corresponding to the penetration position of the tool. The faces of the two zones must of course be absolutely parallel to each other if the required precision is to be achieved.

It will however be readily appreciated that this form of construction is less precise than that previously described since the cam for advancing and retracting the tool rotates continuously. Nevertheless, this arrangement offers the advantage of being much simpler and also of enabling screw-threads of various forms, for example frusto-conical or successively stepped forms, to be readily obtained by simply altering the contour of said cam.

As has been stated above, the stepwise movement of the tool for determining the depth of cut is achieved with the aid of the two discs 8 and 9 disposed getween the vernier V and the timing cam 18. These two discs each have a cylindrical shape and each has two planar non-parallel faces which form the same angle as the faces of the other disc. Thus it will be appreciated that by turning one of the discs in relation to the other a compound angle is obtained which may vary between zero and twice the angle of each of the discs. Also, graduations represented by letters are engraved on the periphery of the disc 9 in order to enable its angular position relative to the disc 8 to be set with the aid of a pointer 39 carried by the latter disc.

It will also be appreciated that by turning the unit consisting of the two discs relatively to the shaft T that carries them, the zone of action can be altered and consequently the progression of the cuts. For this purpose the graduations represented by letters are also engraved on the periphery of the disc 8 and are used in conjunction with an index marked on the plate 13, each of these graduations corresponding to the displacement obtained for a cut. By means of this arrangement the relative angular positions of the two discs and of the plate 13 can be determined with precision with a view to obtaining the required progression of cuts.

The stepwise rotation of the discs 8 and 9 is achieved by intermittent rotation of the one of shafts S. For this purpose the plate 13 on which the discs are secured has a peripheral toothed portion 40 meshing with a pinion 41 mounted on said line of shafts S. The intermittent rotation of this pinion 41 is derived from the continuous rotation of the shaft R by way of a pawl and ratchet system now to be described by particular reference to FIGS. 6 and 7.

Figures 6, 7:
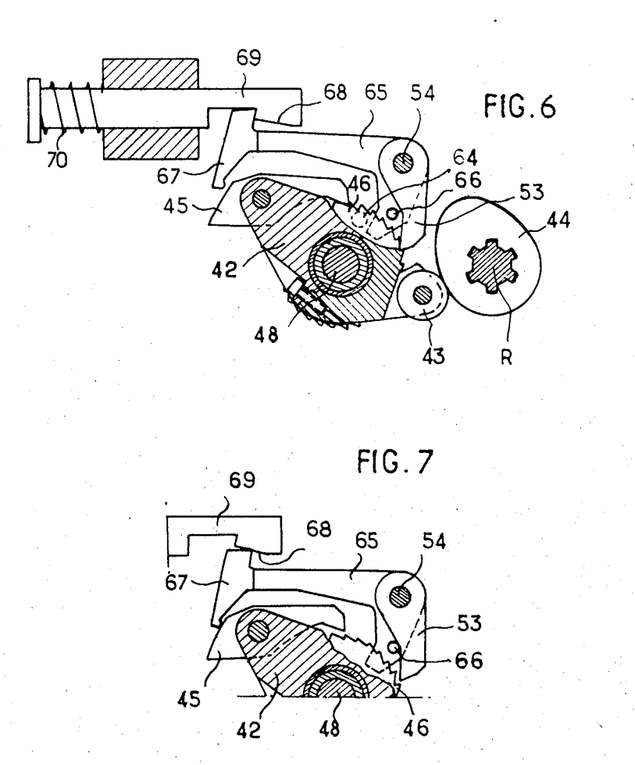
FIG. 6 is a sectional view on line VI—VI of FIG. 3.
FIG. 7 is a view similar to that of FIG. 6 showing the pawl and ratchet system in the disengaged position.

Mounted to rotate freely on the line of shafts S is a lever 42 provided at one of its ends with a roller 43 which, when the longitudinal slide returns, is acted on by a cam 44 securely connected to the shaft R. This lever is provided at its other end with a pawl 45 co-operating with a ratchet wheel 46 likewise mounted on the line of shafts S. This line of shafts S is formed by two independent coaxial parts, namely a lower part 47 which consists mainly of the pinion 41 and carries the rocking lever 22 controlling the advance and return of the tool, and an upper part 48 which, apart from carrying the lever 42 and the ratchet wheel 46, carries a vernier assembly 49 associated with a nut 50 and a ring 51. The two parts of the shaft S are normally solidly interconnected for rotational purposes by means of respective internally-and externally-toothed portions 52.

With each impulse provided by the cam 44, the lever 42 swings through a certain angle in the clockwise direction as senn in FIG. 6 and its pawl 45 then causes the ratchet wheel 46, with which it is in engagement, to advance. After the cam has passed by, the lever returns to its original position whilst the ratchet wheel 46 is held in position by a retaining pawl 53 mounted on a fixed shaft 54. The rotation of the ratchet wheel causes the pinion 41 to rotate through the agency of the toothed portions 52, and consequently causes a rotational movement of the ramped discs 8 and 9, this corresponding to one cut. Thus, with each revolution of the shaft R, the ramped discs turn through a predetermined angle and thereby, by way of the push-rod U, bring about an advance movement of the tool, which movement is independent of that caused by the advance and return cam 18. The extent of this advance depends upon the position of the discs in relation to the plate 13 and thus in fact determines the depth of cut.

The vernier assembly 49, the ratchet wheel 46 and the two parts 47 and 48 of the lines of shafts S form an integral part of the cut counter of the machine. It will also be appreciated that this machine is set when the various mechanisms have been brought back to their non-operating positions, which correspond to a datum position. This datum is reached automatically when the pawls 45 and 53 are disengaged from the ratchet wheel 46 under the action of a return spring 55 secured to the end of a lever 56 firmly connected to the shaft T, as will be described in more detail.

Figure 8:
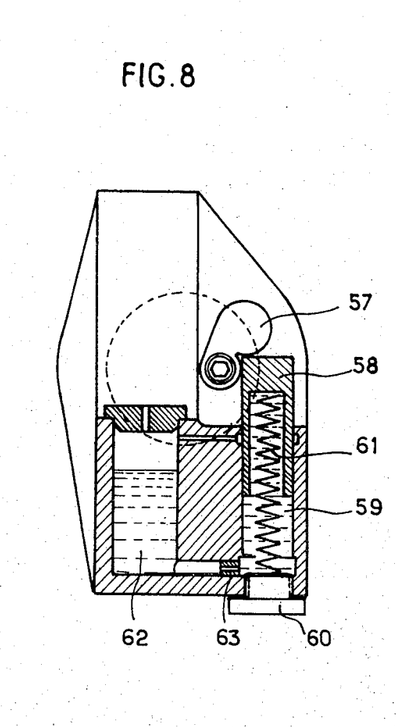
FIG. 8 is a sectional view on the line VIII—VIII of FIG. 3.

The return of shaft T to its datum is slowed down hydraulically so as to avoid too sudden an impact upon completion of travel, which impact would result in the danger of the discs being displaced relatively to the plate 13 under the effect of their own inertia. This hydraulic braking is achieved by an arrangement illustrated in FIG. 8, and mainly comprising a stop lever 57, securely connected to the shaft T and bearing on a shock-absorbing piston 58 adapted to slide freely in a cylinder 59 the end of which is closed by a plug 60. The piston 58 is also acted upon by a return spring 61 which holds it in permanent contact with lever 57. The cylinder 59 is filled with a suitable liquid and, at its lower portion, communicates with an adjacent container 62 by way of a small calibrated orifice 63. Thus, when the shaft T returns to its datum position under the action of the return spring 55, liquid in the cylinder 59 returns to the container 62 by way of this small orifice, and this ensures that the movement is efficiently damped.

The datum position is thus determined by the angular position of shaft T when the shock-absorbing piston 58, against which the lever 57 bears, is in abutment with the plug 60 of the cylinder 59. In this datum position it is possible to loosen the nut 14 so as to bring the discs 8 and 9 into a position to give the desired progression of cuts. Also, it is in this position that the position of the ratchet wheel 46 is fixed in relation to the pinion 41 to give the required number of cuts.

It will in fact be seen that by loosening the nut 50 until it moves into contact with the ring 51, it becomes possible to push back part 47 of the shaft and thus to disengage the toothed portion 52. Then, by means of the vernier 49, the ratchet wheel 46 carried by part 48 of the shaft can be turned until the angular position corresponding to the number of cuts selected is reached.

The pawls 45 and 53 are disengaged from the ratchet wheel 46 automatically on completion of the cycle of operations. Disengagement of the pawls is achieved, as will be seen from FIGS. 6 and 7, with the aid of a stud 64 secured to the ratchet wheel and acting on a lever 65 pivoted above the fixed shaft 54. When the lever 65 pivots under the action of the stud 64 it in turn acts on the retaining pawl 53 by way of a stud 66 and on the advance pawl 45 by way of a heel portion 67, its pivoting movement being accentuated with the help of the effect of an inclined portion 68 of a retaining rod 69 which is acted upon by a return spring 70. The position illustrated in FIG. 7 is then reached, and in this position the ratchet wheel 46 is released and is then able to return to its initial position under the action of the return spring 55 and with the aid of the plate 13 meshing with the pinion 41.

It is therefore the angular distance separating the stud 64 from the co-operating face of the lever 65 that determines the number of cuts achieved in the cycle of operations. The greater this angular distance, the greater will be the number of cuts made during the cycle. To reset the mechanism, all that is required is to push the retaining rod 69, against the action of the spring 70, until the rod engages the rear end 67 of the lever 66 as illustrated in FIG. 6.

Figure 9:
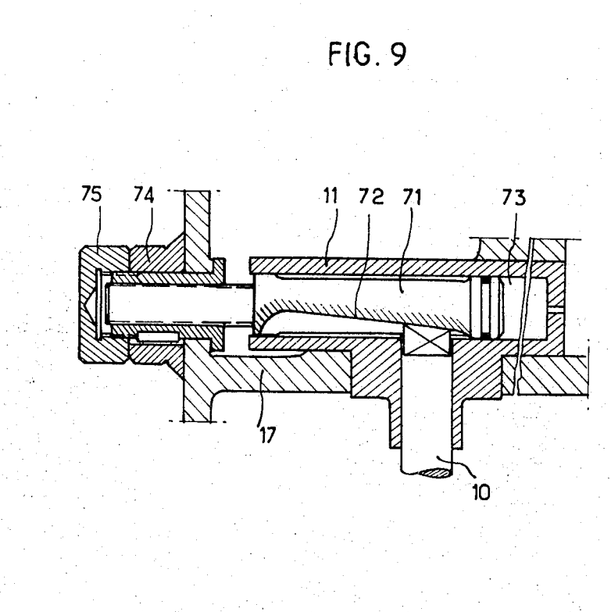
FIG. 9 is a sectional view on the line IX—IX of FIG. 3.

When the shaft T is rotated step by step, the rod 10 of the vernier V bears on the free surface of the upper disc 9 by way of its spherical shoe 12. Referring to FIG. 9, it will be seen that this rod 10 is adjusted positionally by means of a piston 71 having an inclined surface 72 on which bears the other end of the rod, the piston being adapted to slide in a cylinder 73, formed in the body 11 of the vernier, under the action of a graduated knurled knob 54 provided with a lock nut 75. Displacement of the rod 10 causes corresponding displacement of the assembly mounted on the sliding shaft T and consequently causes displacement of the cross slide Y with the aid of the push-rod U, and this enables the position of the tool O to be adjusted in relation to the workpiece P at the commencement of the cycle.

Since the body 11 of the vernier is firmly secured to the frame 17 of the machine, the vernier remains completely stationery for the entire duration of the screw-thread forming operation and therefore does not pose any problem as regards accessibility. Furthermore, the vernier will obviously be very accurate. This accuracy is further increased by the presence of a pneumatic counter-pressure at the base of the cylinder 73, which counter-pressure acts on the end of the piston 71 and consequently enables any play in the operation of the vernier to be completely eliminated.

Thus, in the machine described and illustrated, the number of parts directly involved in determining the transverse position of the tool is reduced to a strict minimum. Furthermore all the parts are aligned. It can be readily seen that the rod 10, the shoe 12, the discs 8 and 9, the toothed plate 13, the stop 20, the timing cam 18, the push-rod U and the shoe 21 are in alignment and operate under simple compression, that is to say under ideal conditions, and this makes the mechanism extremely precise in operation. It will also be seen that this assembly of parts is extremely rigid.

In addition, the extent of the movement of the various parts is kept to the minimum. The rod 10 and the shoe 12 of the vernier V in fact remain absolutely stationary for the entire duration of the machining operation. The discs 8 and 9 carried by the plate 13 turn very slowly and in a stepwise manner as machining proceeds. The only part to turn rapidly is in fact the timing cam 18, the inertia of which is very low. The same is true of the push-rod U, The illustrated thread forming machine thus enables work rates to be obtained that are considerably higher than those obtainable with the known machines of this kind.

What I claim is:

1. A machine for automatically forming screw-threads by a succession of variable cuts, comprising a base, a cross slide for carrying the cutting tool for longitudinal and transverse movement with respect to a workpiece, which cross-slide is mounted on the base, a push-rod for moving the tool-carrying slide in a sense to vary the dept of cut, an adjustment vernier connected to the base and mounted in line with the push-rod, and means for controlling the depth of successive cuts which means includes two discs disposed in face-to-face contact between the vernier and the push-rod and mounted for rotation about an axis parallel to the line of action of the push-rod and for axial movement, and means for rotating the discs stepwise about said axis, each of said discs having two planar non-parallel faces, the faces of one disc forming with each other the same angle as those of the other disc, and the two discs being placed one against the other in relative angular positions which are adjustable.

2. A machine according to claim 1, further comprising a timing cam interposed between the discs and the push-rod and mounted to rotate about an axis parallel to the line of action of the push-rod the cam having a cam face against which the push-rod bears and which is haped to advance the push-rod and tool for each cut and to permit withdrawal of the push-rod and tool at the end of each cut.

3. A machine according to claim 2, wherein means is provided for causing the timing cam to rotate to and fro, comprising a rocking lever connected to the cam, a continuously rotating cam which transmits a rocking motion to said lever, and wherein the speed of the continuously-rotating cam is directly related to the speed of longitudinal movement of the cross-slide and cutting tool.

4. A machine according to claim 2, wherein the timing cam is caused to execute a continuous rotational movement at a speed which is directly related to the speed of longitudinal movement of the cross-slide and cutting tool.

5. A machine according to claim 1, further comprising a shaft on which the discs are mounted for their rotation and axial movement, a pawl and ratchet mechanism connected to rotate the shaft and discs stepwise, means for disconnecting the pawl from the ratchet on completion of a sequence of cuts, a return spring for returning the discs, ratchet and shaft to their initial positions, and damping means for damping the return movement of the discs and shaft.

* * * * *